(12) United States Patent
Bertsch et al.

(10) Patent No.: US 11,623,293 B2
(45) Date of Patent: Apr. 11, 2023

(54) WELDING DEVICE AND WELDING METHOD

(71) Applicant: HILTI AKTIENGESELLSCHAFT, Schaan (LI)

(72) Inventors: Klaus Bertsch, Frastanz (AT); Uwe Popp, Widnau (CH)

(73) Assignee: Hilti Aktiengesellschaft, Schaan (LI)

( * ) Notice: Subject to any disclaimer, the term of this patent is extended or adjusted under 35 U.S.C. 154(b) by 396 days.

(21) Appl. No.: 16/649,310

(22) PCT Filed: Oct. 1, 2018

(86) PCT No.: PCT/EP2018/076602
§ 371 (c)(1),
(2) Date: Mar. 20, 2020

(87) PCT Pub. No.: WO2019/068620
PCT Pub. Date: Apr. 11, 2019

(65) Prior Publication Data
US 2020/0261998 A1 Aug. 20, 2020

(30) Foreign Application Priority Data
Oct. 6, 2017 (EP) .................................... 17195137

(51) Int. Cl.
*B23K 9/095* (2006.01)
*B23K 9/20* (2006.01)
*B23K 37/00* (2006.01)

(52) U.S. Cl.
CPC ............ *B23K 9/0953* (2013.01); *B23K 9/202* (2013.01); *B23K 37/00* (2013.01)

(58) Field of Classification Search
CPC ........ B23K 9/0953; B23K 9/20; B23K 9/206; B23K 9/207; B23K 37/00
See application file for complete search history.

(56) References Cited

U.S. PATENT DOCUMENTS

| 4,456,808 A | 6/1984 | Wilkinson et al. |
| 5,662,820 A | 9/1997 | Schwiete et al. |
| 7,129,437 B2 | 10/2006 | Madsak et al. |
| (Continued) | | |

FOREIGN PATENT DOCUMENTS

| DE | 29507195 U1 | 6/1995 |
| DE | 10059659 A1 | 6/2002 |
| (Continued) | | |

OTHER PUBLICATIONS

Machine Translation of Soyer et al (DE 10059659) performed on Jul. 11, 2022 (Year: 2000).*

(Continued)

*Primary Examiner* — Brian W Jennison
(74) *Attorney, Agent, or Firm* — Leydig, Voit & Mayer, Ltd.

(57) ABSTRACT

A device and method for welding a welding stud to a base is provided. A welding current is applied to a welding stud between the welding stud and the base material, wherein a material of the welding stud and the base material is partially liquefied. The welding stud is then immersed into the solidifying material of the welding stud or the base material in order to create a bond between the welding stud and the base material.

11 Claims, 4 Drawing Sheets

(56) References Cited

U.S. PATENT DOCUMENTS

Figure 1:
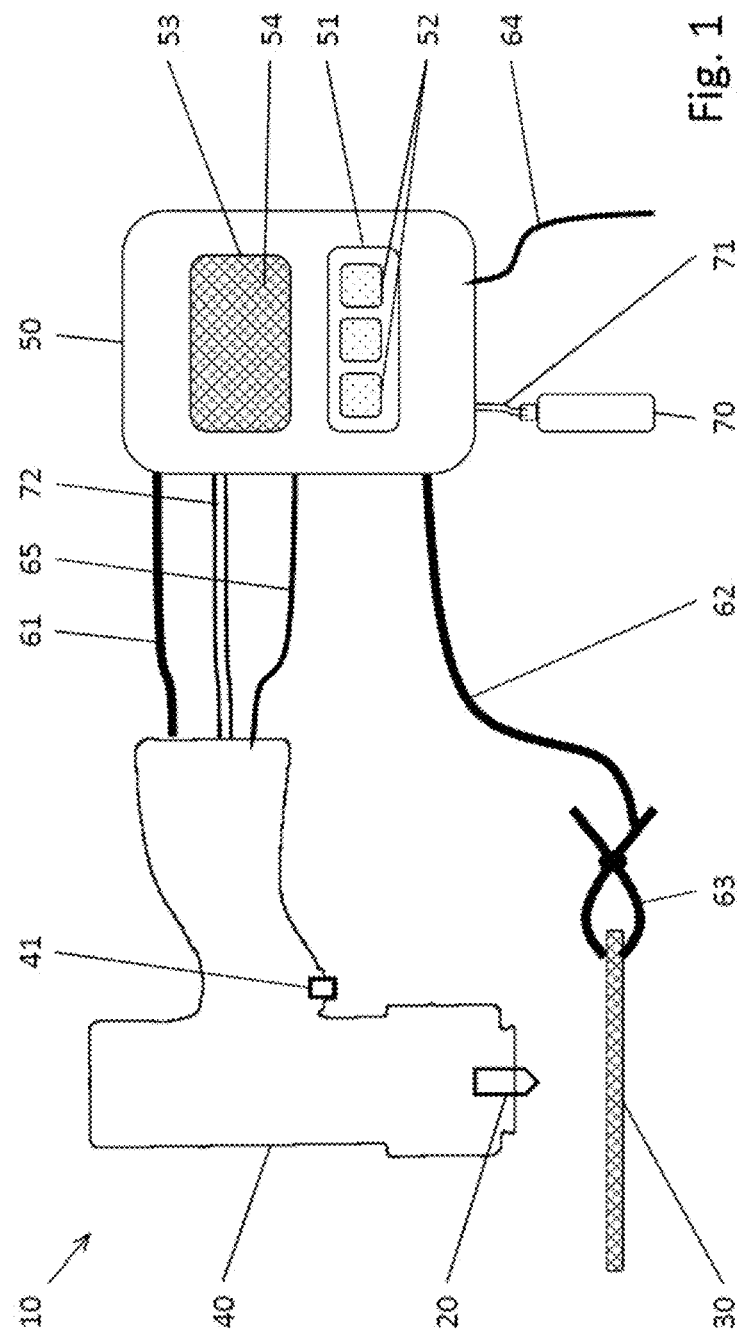

| | | | |
|---|---|---|---|
| 2004/0149695 A1 | 8/2004 | Madsak et al. | |
| 2007/0267392 A1 | 11/2007 | Lame | |
| 2013/0015163 A1* | 1/2013 | Jones .................. | B23K 9/206 |
| | | | 219/98 |

FOREIGN PATENT DOCUMENTS

| | | |
|---|---|---|
| DE | 10124088 A1 | 11/2002 |
| JP | S63-165077 A | 7/1988 |
| JP | H6-574 U | 1/1994 |
| JP | H9-94666 U | 4/1997 |
| JP | 2005-518281 A | 6/2005 |
| JP | 2007-313564 A | 12/2007 |
| JP | 2012-240092 A | 12/2012 |
| WO | WO 82/03033 A1 | 9/1982 |

OTHER PUBLICATIONS

International Bureau, International Search Report in International Application No. PCT/EP2018/076602, dated Jan. 2, 2019.

* cited by examiner

WELDING DEVICE AND WELDING METHOD

CROSS-REFERENCE TO RELATED APPLICATIONS

This patent application is the U.S. National Stage of International Patent Application No. PCT/EP2018/076602, filed Oct. 1, 2018, which claims the benefit of European Patent Application No. 17195137.9, filed Oct. 6, 2017, which are each incorporated by reference.

TECHNICAL FIELD

The invention relates generally to a device and to a method for fastening a stud to a base material and also to such a stud.

BACKGROUND OF THE INVENTION

There are numerous known devices and methods by which various studs are fastened to a base material in different applications. For example, a stud is brought into contact with the base material and an electric current is applied to it. As soon as the electric current flows between the stud and the base material, the stud is lifted off the base material to form an arc. The energy that is released causes the material of the stud and the base material to be partially liquefied. The stud is then immersed into the liquefied material before this material cools down and becomes solid. The stud ends up being bonded to the base material.

In order to provide the necessary energy for liquefying the material of the stud and the base material in a sufficiently short time, there are known devices that generate an electric current of a very high intensity and use a correspondingly rated electric cable to feed it to the stud. To avoid oxidizing of the liquefied material, it is known to surround the area of contact between the stud and the base material with an inert gas.

In the case of applications in building construction or shipbuilding for example, threaded studs of various sizes to which an item is screwed are used in order to fasten the item to the base material. Some parameters of the fastening method, such as for example the duration and electrical power of the electric current, are to be set by a user on the device and are to be adapted to the stud that is used. The user finally assesses the quality of the connection between the stud and the base material by means of a visual inspection. The quality of the connection consequently also depends on the experience and capabilities of the user.

BRIEF SUMMARY OF THE INVENTION

The object of the invention is to provide a device and/or a method with which fastening of a stud to a base material is made easier and/or improved.

The subject matter of this application is a device for welding a welding stud to a base material. The device comprises a stud holder, a welding-current contact element for applying a welding current to the welding stud in order to partially liquefy a material of the welding stud and/or the base material, and a stud immersing device for immersing the welding stud into the liquefied material of the welding stud and/or the base material when the welding stud and/or the base material is partially liquefied due to the welding current. In addition, the device preferably comprises a stud lifting device for lifting the welding stud from the base material while maintaining the welding current flowing between the welding stud and the base material, particularly preferably with the formation of an arc between the welding stud and the base material. The stud holder likewise preferably comprises the welding-current contact element.

According to one aspect of the application, the device comprises a device for influencing the speed of the welding stud brought about by the stud immersing device while the welding stud is being immersed into the liquefied material of the welding stud and/or the base material. This allows a controlled movement of the welding stud, so that the welding operation is stabilized.

An advantageous configuration consists in that the device for influencing the speed of the welding stud has a first actuator and a second actuator. The first actuator preferably comprises a first lifting magnet. The second actuator likewise preferably comprises a second lifting magnet.

An advantageous configuration consists in that the second actuator acts in the opposite direction to the first actuator. In an alternative configuration, the second actuator acts in the same direction as the first actuator.

An advantageous configuration consists in that an influence of the second actuator on the speed of the welding stud brought about by the stud immersing device can be controlled. In an alternative configuration, an influence of the second actuator on the speed of the welding stud brought about by the stud immersing device is specified.

An advantageous configuration consists in that the device comprises a control device for controlling the stud lifting device and/or the stud immersing device and/or the device for influencing the speed of the welding stud.

An advantageous configuration consists in that the device for influencing the speed of the welding stud comprises a linear or non-linear gear mechanism, preferably a coupling gear mechanism or a toggle-lever gear mechanism, which transmits a movement of the stud lifting device and/or the stud immersing device into a movement of the stud holder.

An advantageous configuration consists in that the device for influencing the speed of the welding stud is intended to delay and/or to reverse a movement of the welding stud caused by the stud immersing device, preferably a number of times.

According to one aspect of the application, the device comprises a detection device for detecting emissions generated during the welding operation, preferably during the immersion of the welding stud into the liquefied material of the welding stud and/or the base material. This makes it possible to assess the quality of the welded connection between the welding stud and the base material according to objective criteria.

An advantageous configuration consists in that the detection device is intended for detecting acoustic, electrical, magnetic and/or optical emissions.

An advantageous configuration consists in that the device comprises a control device for controlling one or more parameters of the welding operation in dependence on the detected emissions. The control device is preferably intended for controlling an electrical voltage and/or a current intensity of the welding current, and/or a speed and/or a position and/or a direction of movement of the welding stud.

An advantageous embodiment consists in that the device has an output device for outputting information about the detected emissions and/or information derived from the detected emissions. The output device preferably comprises a visual display.

An advantageous configuration consists in that the information that can be output by the output device comprises information about a quality of the welding operation and/or about measures for improving the welding operation.

A further advantageous configuration consists in that the output device comprises a wireless transmission device.

According to a further aspect of the application, the device comprises an identification device for detecting one or more stud characteristics of the welding stud and a control device for controlling one or more parameters of the welding operation in dependence on the stud characteristics detected. As a result, under some circumstances it may not be necessary for a user of the device to set the stated parameters of the welding operation itself.

An advantageous configuration consists in that the identification device is intended for detecting a length and/or a width and/or a diameter and/or a material and/or an identification element of the welding stud attached to the welding stud at the factory. If such an identification element is detected, it is possible to assign one or more of the variables mentioned and/or the material to the welding stud.

A further advantageous configuration consists in that the control device is intended for controlling an electrical voltage and/or a current intensity of the welding current, and/or a speed and/or a position and/or a direction of movement of the welding stud, in each case on the basis of the detected stud characteristics of the welding stud.

A further advantageous configuration consists in that the device has an output device for outputting information about the detected stud characteristics and/or information derived from the detected stud characteristics. The output device preferably comprises a wireless transmission device.

According to a further aspect of the application, the device comprises a detecting device for detecting one or more parameters of the welding operation, a data memory for storing the parameters detected by the detecting device and a control device which is suitable for comparing parameters detected by the detecting device during a current welding operation with parameters stored in the data memory. This makes it possible to determine changes that occur during the operation of the device, for example as a result of wear and/or contamination.

An advantageous configuration consists in that the device further comprises an output device, the control device being intended to output by means of the output device differences between the parameters detected by the detecting device during the current welding operation and the parameters stored in the data memory and/or information derived from such differences. The derived information preferably comprises a recommendation and/or for cleaning and/or maintaining the device.

A further advantageous configuration consists in that the output device comprises a visual display. A further advantageous configuration consists in that the output device comprises a wireless transmission device.

A further advantageous configuration consists in that the parameters of the welding operation that can be detected by the detecting device comprise an electrical voltage and/or a current intensity of the welding current, and/or a speed and/or a position and/or a direction of movement of the welding stud and/or a number of welding operations carried out.

A further advantageous configuration consists in that the control device is suitable for controlling one or more parameters of a subsequent welding operation in dependence on the parameters detected by the detecting device during a previous welding operation. As a result, under some circumstances it is possible to compensate for the changes in parameters of the welding operation that have been ascertained.

According to a further aspect of the application, the device is suitable for welding a welding stud to a specified location on a base material and comprises a device for finding the specified location.

A further advantageous configuration consists in that the device for finding the specified location comprises a detection device for detecting a variable that distinguishes the specified location from a remaining surface of the base material.

The variable that distinguishes the specified location from the remaining surface of the base material preferably comprises a contact resistance between the device and the base material and/or between the stud and the base material. The variable that distinguishes the specified location from the remaining surface of the base material likewise preferably comprises a difference in height between the specified location and the remaining surface of the base material. The detection device particularly preferably comprises an optical sensor for detecting a distance between the device and a region of the base material arranged opposite the stud and/or the stud holder. As an alternative or in addition, the detection device is particularly preferably intended to detect a position of the welding stud and/or the stud holder relative to the rest of the device, in order to detect the difference in height between the specified location and the remaining surface of the base material.

A further advantageous configuration consists in that the device for finding the specified location comprises a projection device for projecting one or more auxiliary lines. A further advantageous configuration consists in that the device has one or more display elements.

According to a further aspect of the application, the device comprises a determination device for determining one or more variables characterizing the immersion movement of the welding stud into the liquefied material of the welding stud and/or the base material that is brought about by the stud immersing device. As a result, under some circumstances an objective assessment of the quality of the welded connection between the welding stud and the base surface is made possible.

An advantageous configuration consists in that the determination device is suitable for determining a time duration of the immersion movement and/or a speed of the welding stud during the immersion movement and/or a position of the welding stud before the lifting movement and/or after the immersion movement.

A further advantageous configuration consists in that the device further comprises a control device for controlling the stud lifting device and/or the stud immersing device and/or the electrical voltage and/or the current intensity of the welding current.

A further advantageous configuration consists in that the device further comprises a control device for controlling one or more parameters of the welding operation in dependence on the variables determined. The control device is preferably intended for controlling an electrical voltage and/or a current intensity of the welding current, and/or a speed and/or a position and/or a direction of movement of the welding stud.

A further advantageous configuration consists in that the device further comprises an output device for outputting information about the variables determined and/or information derived from the variables determined. The output device preferably comprises a visual display and/or a wireless transmission device.

A further advantageous configuration consists in that the information that can be output by the output device comprises information about a quality of the welding operation and/or about measures for improving the welding operation.

Likewise the subject of this application is a method for welding a welding stud to a base material, in which a welding stud is provided and a welding current is applied between the welding stud and the base material, a material of the welding stud and/or the base material is partially liquefied and allowed to solidify and the welding stud is immersed into the liquefied material of the welding stud or the base material before it solidifies. The welding stud is preferably lifted off the base material while maintaining the welding current flowing between the welding stud and the base material, particularly preferably with the formation of an arc between the welding stud and the base material.

According to one aspect of the application, in the method the speed of the welding stud is influenced while the welding stud is being immersed into the liquefied material of the welding stud or the base material.

An advantageous configuration consists in that a first actuator, which preferably comprises a first lifting magnet, and a second actuator, which preferably comprises a second lifting magnet, are activated to influence the speed of the welding stud. The second actuator preferably acts in the opposite direction to the first actuator.

An advantageous configuration consists in that an influence of the second actuator on the speed of the welding stud brought about by the stud immersing device is controlled. An alternative configuration consists in that an influence of the second actuator on the speed of the welding stud brought about by the stud immersing device is specified.

A further advantageous configuration consists in that the first actuator and the second actuator are operated alternately and/or simultaneously.

A further advantageous configuration consists in that a movement of the welding stud during immersion into the liquefied material of the welding stud or the base material is delayed and/or reversed, in particular a number of times.

According to a further aspect of the application, in the method emissions generated during the welding operation are detected, preferably during the immersion of the welding stud into the liquefied material of the welding stud and/or the base material.

A further advantageous configuration consists in that the detected emissions are acoustic, electrical, magnetic and/or optical emissions.

A further advantageous configuration consists in that one or more parameters of the welding operation are controlled in dependence on the detected emissions.

A further advantageous configuration consists in that the parameter is an electrical voltage and/or a current intensity of the welding current, and/or a speed and/or a position and/or a direction of movement of the welding stud.

A further advantageous configuration consists in that information about the detected emissions and/or information derived from the detected emissions is output. Information about a quality of the welding operation and/or about measures for improving the welding operation are preferably output.

A further advantageous configuration consists in that, after a welding operation has been carried out, a user is enabled to enter an assessment of a quality of the welding operation, and an input by the user is used to assess a quality of future welding operations.

According to a further aspect of the application, one or more stud characteristics of the welding stud are recorded and one or more parameters of the welding operation are controlled in dependence on the stud characteristics detected.

An advantageous configuration consists in that a length and/or a width and/or a diameter and/or a material and/or an identification element of the welding stud attached to the welding stud at the factory is detected as a stud characteristic.

A further advantageous configuration consists in that an electrical voltage and/or a current intensity of the welding current, and/or a speed and/or a position and/or a direction of movement of the welding stud is controlled as a parameter of the welding operation.

A further advantageous configuration consists in that information about the detected stud characteristics and/or information derived from the detected stud characteristics is output.

The information about the detected stud characteristics or the information derived from the detected stud characteristics is preferably transmitted wirelessly.

According to a further aspect of the application, in the method one or more parameters of the welding operation are detected and stored. Parameters detected by the detecting device during a current welding operation are compared with parameters stored in the data memory.

An advantageous configuration consists in that differences between the parameters detected by the detecting device during the current welding operation and the parameters stored in the data memory and/or information derived from such differences are output. The derived information preferably comprises a recommendation and/or request for cleaning and/or maintaining the device.

An advantageous configuration consists in that the differences between the parameters detected by the detecting device during the current welding operation and the parameters stored in the data memory or the information derived from such differences are output visually. A further advantageous configuration consists in that the differences between the parameters detected by the detecting device during the current welding operation and the parameters stored in the data memory or the information derived from such differences are transmitted wirelessly.

A further advantageous configuration consists in that the detected parameters of the welding operation comprise an electrical voltage and/or a current intensity of the welding current, and/or a speed and/or a position and/or a direction of movement of the welding stud and/or a number of welding operations carried out.

A further advantageous configuration consists in that one or more parameters of a subsequent welding operation are controlled in dependence on the parameters detected during a previous welding operation.

According to a further aspect of the application, in the method one or more variables characterizing the immersion movement of the welding stud brought about by the stud immersing device into the liquefied material of the welding stud and/or the base material are determined.

An advantageous configuration consists in that one or more parameters of the welding operation are controlled in dependence on the variables determined. The controlled parameters are preferably an electrical voltage and/or a current intensity of the welding current, and/or a speed and/or a position and/or a direction of movement of the welding stud.

A further advantageous configuration consists in that information about the variables determined and/or information derived from the variables determined is output. This information is preferably information about a quality of the welding operation and/or about measures for improving the welding operation.

A further advantageous configuration consists in that, after a welding operation has been carried out, a user is enabled to enter an assessment of a quality of the welding operation, and an input by the user is used to assess a quality of future welding operations.

BRIEF DESCRIPTION OF THE SEVERAL VIEWS OF THE DRAWING(S)

Figure 2:
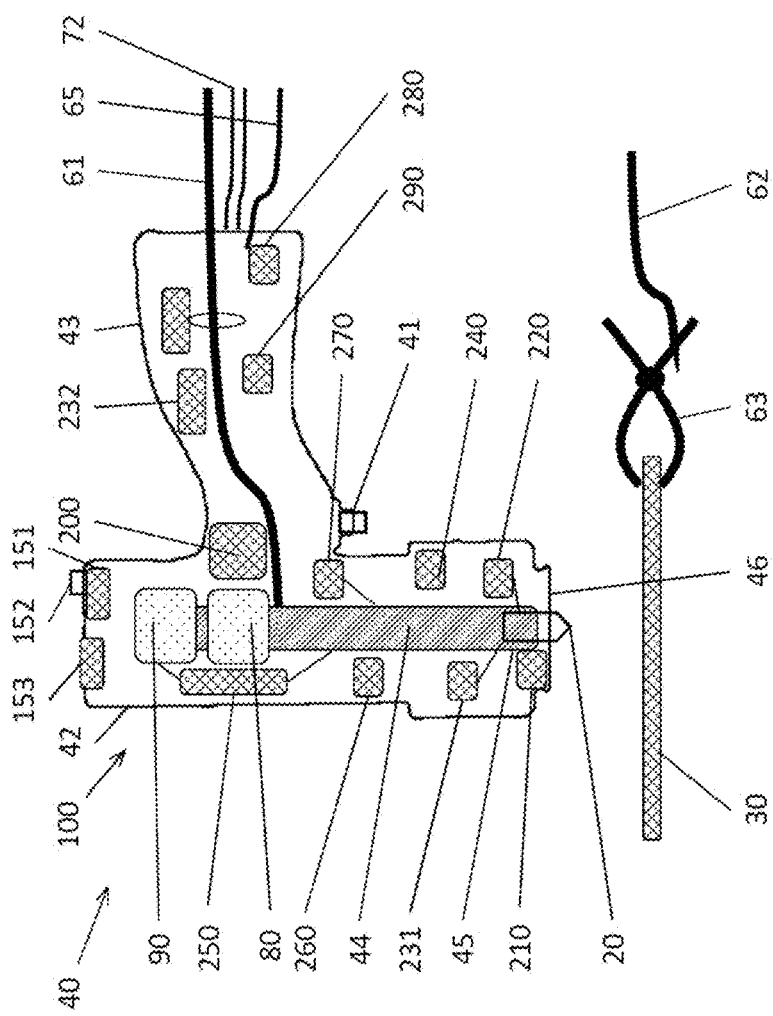
Figure 4:
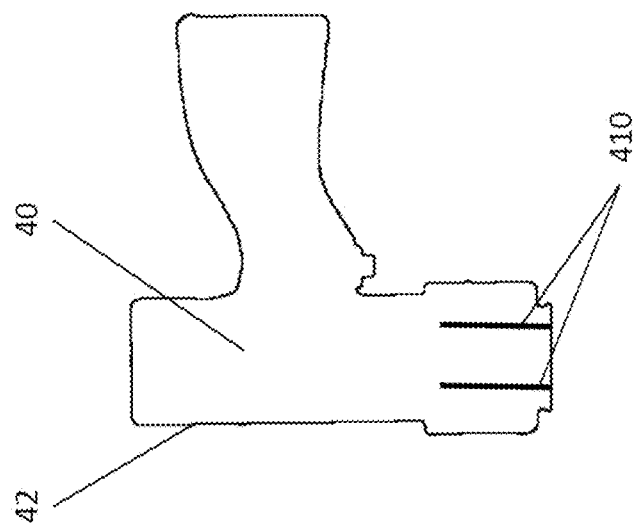
Figure 3:
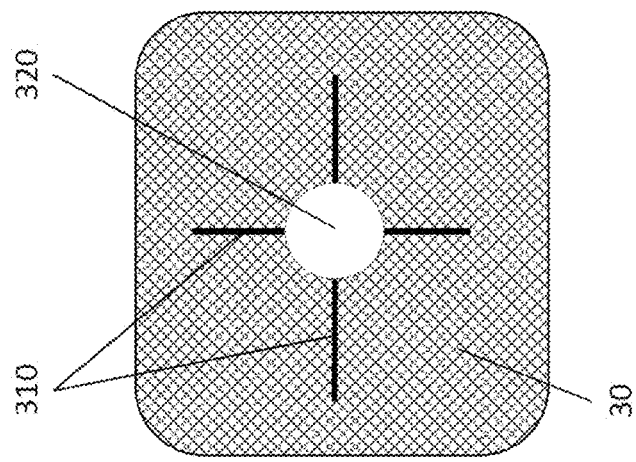
Figure 5:
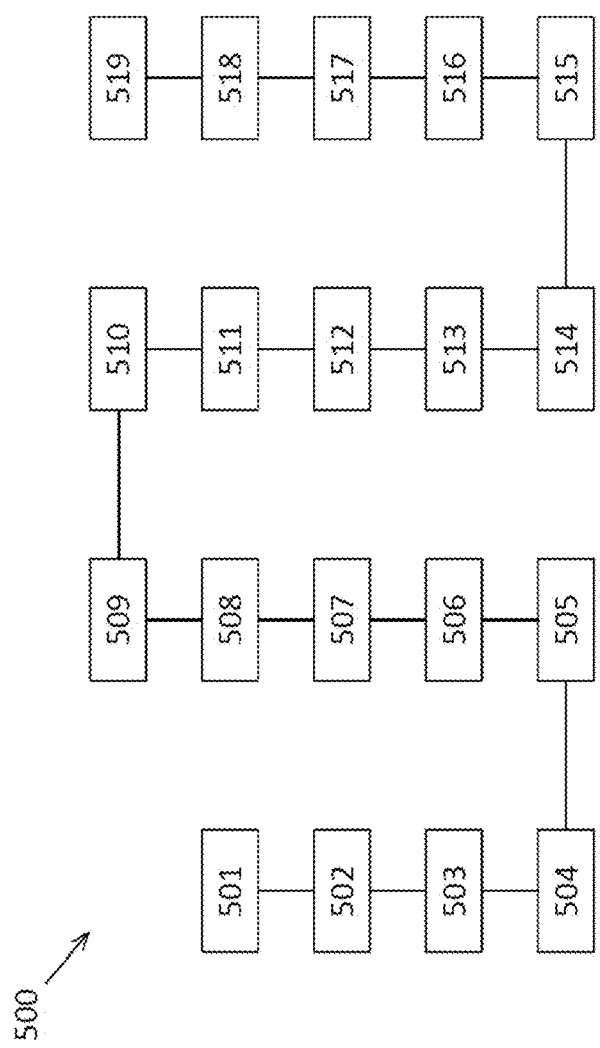

The invention will be explained in more detail below on the basis of exemplary embodiments with reference to the drawings. In the drawings:

FIG. 1 schematically shows a welding device,
FIG. 2 schematically shows a welding gun,
FIG. 3 shows a base material,
FIG. 4 shows a welding gun and
FIG. 5 shows a flow diagram of a welding method.

DETAILED DESCRIPTION OF THE INVENTION

In FIG. 1, a welding device 10 for welding a welding stud 20 to a base material 30 is schematically represented. A material of the welding stud 20 and a material of the base material 30 are electrically conductive, in particular metallic. The welding device 10 comprises a welding gun 40 with a trigger switch 41, formed as a pushbutton switch, a welding unit 50, a first electric cable 61, a second electric cable 62 with a connection terminal 63, an electric supply cable 64, formed for example as a power cable, an electrical communication line 65, a gas reservoir 70, formed as a gas cylinder, a tubular gas supply line 71 and a gas hose 72.

The first cable 61 serves for supplying the welding stud 20 with electric current through the welding unit 50. The second cable 62 serves for electrically connecting the base material 30 to the welding unit 50 when the connection terminal 63 is clamped to the base material 30. When the welding stud 20 comes into contact with the base material 30, a circuit closes, so that welding current, for example in the form of direct current or alternating current, can be applied to the welding stud 20 by the welding unit 50. For this purpose, the welding gun 40 comprises a welding-current contact element that is not shown in FIG. 1. The welding unit 50 comprises a device that is not shown for converting electric current from the supply cable 64 into welding current, which comprises for example an electrical capacitor, a thyristor, a bipolar transistor with an isolated gate electrode or other components from power electronics and also an associated control unit with a microprocessor, in order to provide the welding current at the desired voltage and current intensity.

The gas supply line 71 and the gas hose 72 serve for supplying a contact region between the welding stud 20 and the base material 30 with an inert gas from the gas reservoir 70, in order to protect the contact region from oxidation due to oxygen from a surrounding area during a welding operation. For controlling a gas flow to the contact region, the gas reservoir 70, the gas supply line 71, the welding unit 50, the gas hose 72 or the welding gun 40 comprises a valve, in particular a controllable valve, that is not shown.

The welding unit 50 has an input device 51 with actuating elements 52 and also an output device 53 with a visual display element 54 and a wireless transmission unit. The input device 51 serves for inputting parameters of a welding method to be carried out with the welding device 10, such as for example the electrical voltage, current intensity, power and time duration of the welding current, position and speed of the stud and so on, by a user of the welding device 10. The output device 53 serves for outputting information to the user, such as for example information on parameters of the welding method, information on detected emissions of the welding method or other variables, information on a quality of the welding operation, information on measures for improving the welding operation, information on detected characteristics of the welding stud or information derived from the aforementioned variables, and/or recommendations or instructions for cleaning and/or maintaining the welding device 10, in particular the welding gun 40.

The communication line 65 serves for communication between the welding gun 40, in particular a control device of the welding gun 40 that is not shown in FIG. 1, and the welding unit 50, in particular the control unit and/or the input device 51 and/or the output device 53. By means of this communication, for example, an exchange of information about the parameters of a welding operation is accomplished, in order for example to achieve or facilitate a synchronization of the welding current with a movement of the welding stud 20. In the case of exemplary embodiments that are not shown, the communication between the welding gun and the welding unit takes place wirelessly, by radio or by means of the first electric cable, which carries the welding current.

In FIG. 2, the welding gun 40 is shown in more detail, with the welding stud 20 for fastening to the base material 30. The welding gun 40 has a housing 42 with an opening 46, from which housing a handle 43 with the trigger switch 41 protrudes. Also shown are the first electric cable 61, the second electric cable 62 with the connection terminal 63 clamped to the base material 30, the electrical communication line 65 and the gas hose 72.

The welding gun 40 also has a stud holder 44, on which the welding stud 20 is held during a welding operation. For this purpose, the stud holder comprises for example two, three, four or more resilient arms that are not shown in detail, between which the welding stud 20 is inserted and held by means of a clamping fit. The welding gun 40 also has for applying a welding current to the welding stud 20 a welding-current contact element 45, which is integrated in the stud holder 44, for example in the form of one or more of the resilient arms.

The welding gun 40 also has a control device 200 for controlling the various components and devices of the welding gun and of the welding unit 50. The control device 200 is intended for controlling one or more parameters of the welding operation. For this purpose, the control device 200 comprises various electronic components, such as for example one or more microprocessors, one or more temporary or permanent data memories, and the like.

The welding gun 40 also has a stud lifting device 80, which is formed as a first lifting magnet, which acts on the stud holder 44 with a force away from the opening 46 to the rear (upwardly in FIG. 2) when the stud lifting device 80 is activated. Via a signal line that is not shown, the control device 200 communicates with the stud lifting device 80 in order to control the stud lifting device 80, in particular to activate and deactivate it.

The welding gun 40 also has a stud immersing device 90, formed as a second lifting magnet, which acts on the stud holder 44 forwardly with a force toward the opening 46 (downwardly in FIG. 2) when the stud immersing device 90 is activated. Via a signal line that is not shown, the control device 200 communicates with the stud immersing device 90 in order to control the stud immersing device 90, in particular to activate and deactivate it. In the case of an exemplary embodiment that is not shown, the stud immersing device is formed as a spring element which is tensioned when the stud holder is moved rearward by the stud lifting device and which moves the stud holder forward as soon as the stud lifting device is deactivated.

The welding gun 40 also has an influencing device 100 for influencing the speed of the welding stud brought about by the stud immersing device 90. The influencing device 100 comprises the stud lifting device 80, formed as the first lifting magnet, as a first actuator and the stud immersing device 90, formed as the second lifting magnet, as a second actuator. In this case, the second actuator acts in the opposite direction to the first actuator. In the case of an exemplary embodiment that is not shown, the second actuator acts in the same direction as the first actuator. In both cases, the speed of the welding stud is influenced by the stud lifting device 80 and the stud immersing device 90 being alternately and/or simultaneously activated and deactivated by the control device 200. This makes it possible to repeatedly delay and/or reverse the movement of the welding stud 20 caused by the stud immersing device 90.

The welding gun 40 also has a detection device 210 for detecting emissions generated during the welding operation. The detection device 210 comprises, for example, a vibration sensor, a microphone, a temperature sensor, a radiation sensor, a camera or the like for the detection of acoustic, electrical, magnetic and/or optical emissions. Via a signal line that is not shown, the control device 200 communicates with the detection device 210 in order to receive signals representing the detected emissions and to carry out the control of the welding operation accordingly.

The welding gun 40 also has an identification device 220 for detecting one or more stud characteristics of the welding stud 20. The identification device 220 is suitable for detecting geometrical stud characteristics, such as for example a length and/or a width and/or a diameter of the welding stud 20. In the case of exemplary embodiments that are not shown, the identification device is suitable for detecting a material of the welding stud or an identification element of the welding stud attached to the welding stud at the factory. The welding gun 40 also has a stud-holder identification device 270, which is intended for detecting an identification element attached to the stud holder 44. If each stud type is assigned to a stud holder type, this allows an indirect detection of stud characteristics. For example, the stud holder 44 is only suitable for holding studs of a specific diameter, so that it is possible to conclude from detecting the stud holder 44 the diameter of the welding stud 20. Via a signal line that is not shown, the control device 200 communicates with the identification device in order to receive signals representing the detected stud characteristics and to carry out the control of the welding operation accordingly. In the case of an exemplary embodiment that is not shown, the identification element is attached to a packaging of the welding stud and is read, for example by way of a QR code or RFID, in particular by means of a cell phone or similar device.

The welding gun 40 also comprises a voltage detecting device 231 for detecting an electrical voltage applied between the welding stud 20 and the base material 30 during the welding operation and a current detecting device 232 for detecting an intensity of a current flowing between the welding stud 20 and the base material 30 during the welding operation. For this purpose, the voltage detecting device 231 preferably comprises a measuring contact, for example mounted at the opening 46, for tapping the electrical potential of the base material 30. Via a signal line that is not shown, the control device 200 communicates with the voltage detecting device 231 and the current-intensity detecting device 232 in order to receive signals representing the electrical voltage or current intensity, store them in one of their data memories and control one or more parameters of a subsequent welding operation in dependence on the parameters detected by the detecting devices 231, 232 during a previous welding operation.

The welding gun 40 also comprises a determination device 260 for determining a time duration of the immersing movement and a speed of the welding stud during the immersing movement of the welding stud 20. The position detecting device 250 is suitable for determining the position of the welding stud prior to the lifting-off movement and after the immersing movement, and the control device 200 is suitable for determining a difference between these two positions and assessing the quality of the welded connection between the welding stud 20 and the base material 30.

The welding gun 40 also has an input device 151 with an actuating element 152 and also an output device 153 with a visual display element and a wireless transmission unit. The input device 151 serves for inputting parameters of a welding method to be carried out with the welding gun 40, such as for example the electrical voltage, current intensity, power and time duration of the welding current, position and speed of the stud, and so on, by a user of the welding gun 40. The output device 153 serves for outputting information to the user, such as for example information on parameters of the welding method, information on detected emissions of the welding method or other variables, information on a quality of the welding operation, information on measures for improving the welding operation, information on detected characteristics of the welding stud or information derived from the aforementioned variables, and/or recommendations or instructions for cleaning and/or maintaining the welding gun 40. Via signal lines that are not shown, the control device 200 communicates with the input device 151 and the output device 153 to receive information input by means of the input device 151 or to send information to be output to the output device 153.

The welding gun 40 also has an orientation detection device 290 for detecting an orientation of the welding gun 40 with respect to the direction of gravity. The orientation detection device 290 detects for example whether the welding gun 40 is aligned downward, to the side or upward during the welding operation. The orientation detection device 290 determines the orientation of the welding gun 40, for example by evaluating the acceleration of the stud holder during a lifting movement or by evaluating a time profile of the electrical voltage of the welding current. The information about the orientation of the welding gun 40 serves for improved control of the parameters of the welding operation.

As part of a device for finding a welding location specified for the welding stud, the welding gun 40 also comprises a detection device 240 for detecting an electrical contact resistance between the welding gun 40, in particular the opening 46 or the stud holder 44, and the base material 30 and/or between the welding stud 20 and the base material 30. In addition, the device for finding a welding location specified for the welding stud comprises a position detecting device 250 for detecting the position of the welding stud 20 and the stud holder 44 with respect to the remainder of the welding gun 40 to detect a difference in height between the specified location and the remaining surface of the base material. Via a signal line that is not shown, the control device 200 communicates with the detection device 240 and the position detecting device 250 in order to receive and process signals which represent the contact resistance or the position of the welding stud 20 and the stud holder 44.

As a further part of the device for finding the welding location specified for the welding stud 20, the welding gun comprises a projection device 280 for projecting one or more auxiliary lines onto the base material 30. For this purpose, the projection device 280 has for example a laser, which projects the auxiliary lines onto the base material 30. The auxiliary lines indicate to a user of the welding gun 40 the location on the base material 30 to which the welding stud 20 is welded at the respective position of the welding gun 40.

FIG. 3 shows auxiliary lines 310, which are projected onto the base material 30 by the projection device 280. Before the welding operation, the user draws a line cross at the desired welding location 320 for the welding stud 20. Then he takes the welding gun 40 in his hand, brings the auxiliary lines 310 into alignment with the drawn line cross and maintains the position of the welding gun 40 thus obtained during the welding operation.

FIG. 4 shows, as a further part of the device for finding the welding location specified for the welding stud 20, linear markings 410, which are attached to the outside of the housing 42 of the welding gun 40. The user thus has the possibility of aligning the markings 410 with a line cross drawn at the specified welding location in order to bring the welding gun 40 reliably into the desired position. The housing 42 preferably has four markings 410, which are attached to a circumference of the housing 42 at equal angular intervals of 90°.

FIG. 5 schematically shows a method 500 for welding a welding stud to a base material, for example the welding stud 20 to the base material 30. In a first step 501, the base material is provided. In a further step 502, a welding device with a control device is provided. In a further step 503, a welding stud is provided.

In a further step 504, information, for example about desired parameters of the following welding operation, are input by a user via an input device. In a further step 505, one or more stud characteristics of the welding stud are detected by means of an identification device, for example a length and/or a width and/or a diameter and/or a material and/or an identification element of the welding stud attached to the welding stud or its packaging at the factory. In a further step 506, information about the detected stud characteristics and/or information derived from the detected stud characteristics is output via an output device.

In a further step 507, a welding current is applied to the welding stud between the welding stud and the base material. In a further step 508, the welding stud is lifted off the base material by means of a stud lifting device while maintaining the welding current flowing between the welding stud and the base material, an arc forming between the welding stud and the base material. In a further step 509, a material of the welding stud and/or the base material is partially liquefied, in particular due to the heat generated by the arc.

In a further step 510, the welding stud is immersed into the liquefied material of the welding stud or the base material by means of a stud immersing device. In a further step 511, an electrical voltage and/or a current intensity of the welding current, and/or a speed and/or a position and/or a direction of movement of the welding stud are controlled as parameters of the welding operation. In order to influence the speed of the welding stud while the welding stud is being immersed into the liquefied material of the welding stud or the base material, a first actuator and a second actuator are activated by the control device, the second actuator acting in the opposite direction to the first actuator. A movement of the welding stud during the immersion into the liquefied material of the welding stud or the base material is reversed a number of times, so that under some circumstances a more uniform consistency of the liquefied material is obtained.

In a further step 512, emissions generated during the welding operation are detected by means of a detection device. In a further step 513, an electrical voltage and/or a current intensity of the welding current, and/or a speed and/or a position and/or a direction of movement of the welding stud are determined by means of a determination device.

In a further step 514, the liquefied material of the welding stud and/or the base material solidifies, so that the welding stud is bonded to the base material. In a further step 5, one or more parameters of the welding operation are detected and stored.

In a further step 515, during a current welding operation parameters detected by the detecting device are compared with parameters stored in the data memory. In a further step 516, differences between the parameters detected by the detecting device during the current welding operation and the parameters stored in the data memory and/or information derived from such differences are output. The derived information preferably comprises a recommendation and/or request for cleaning and/or maintaining the device. The detected parameters of the welding operation comprise an electrical voltage and/or a current intensity of the welding current, and/or a speed and/or a position and/or a direction of movement of the welding stud and/or a number of welding operations carried out. In a further step 516, one or more parameters of a subsequent welding operation are controlled in dependence on the parameters detected during a previous welding operation.

In a further step 517, information is output via an output device. The information output is, for example, information about the detected emissions and/or information derived from the detected emissions, for example information about a quality of the welding operation and/or about measures for improving the welding operation, or information about the variables determined by the determination device and/or information derived from the variables determined.

In a further step 518, after a welding operation has been carried out, an assessment of a quality of the welding operation is input by a user. In a further step 519, an input by the user is used to assess a quality of future welding operations.

The invention has been described on the basis of examples of a device and a method for welding a welding stud to a base material. The features of the described embodiments can also be combined as desired with one another within a single welding device or a single welding method. It is pointed out that the device according to the invention and the method according to the invention are also suitable for other purposes.

The invention claimed is:

1. A welding device for welding a welding stud to a base material, the device comprising a stud holder; a welding-current contact element for applying a welding current to the welding stud to partially liquefy a material of the welding stud and/or the base material; a stud immersing device for immersing the welding stud into the liquefied material of the welding stud and/or the base material when the welding stud and/or the base material is partially liquefied due to the welding current; a detecting device for detecting one or more parameters of a welding operation; a data memory for storing the one or more parameters detected by the detecting device; a control device which is suitable for comparing the one or more parameters detected by the detecting device during a current welding operation with the one or more parameters stored in the data memory, and an output device, the control device outputting, by the output device, differences between the one or more parameters detected by the detecting device during the current welding operation and the one or more parameters stored in the data memory and/or information derived from the differences, wherein the information derived comprises a recommendation and/or request for cleaning and/or maintaining the welding device.

2. The welding device as claimed in claim 1, wherein the output device comprises a visual display.

3. The welding device as claimed in claim 1, wherein the output device comprises a wireless transmission device.

4. The welding device as claimed in claim 1, wherein the one or more parameters of the welding operation that can be detected by the detecting device comprise an electrical voltage and/or a current intensity of the welding current, and/or a speed and/or a position and/or a direction of movement of the welding stud and/or a number of welding operations carried out.

5. The welding device as claimed in claim 1, wherein the control device is suitable for controlling the one or more parameters of a subsequent welding operation in dependence on the one or more parameters detected by the detecting device during a previous welding operation.

6. A method for welding a welding stud to a base, material using a welding device in a welding operation, the method comprising
   a) providing a welding stud,
   b) applying a welding current to the welding stud between the welding stud and the base material,
   c) partially liquefying a material of the welding stud and/or the base material,
   d) allowing the liquefied material of the welding stud or the base material to solidify,
   e) immersing the welding stud into the liquefied material of the welding stud or the base material before it solidifies,
   f) detecting one or more parameters of the welding operation by a detecting device, and outputting differences between the one or more parameters detected by the detecting device during a current welding operation and the one or more parameters stored in a data memory and/or information derived from the differences, wherein the information derived comprises a recommendation and/or request for cleaning and/or maintaining the welding device
   g) storing the one or more parameters detected by the detecting device, and
   h) comparing the one or more parameters detected by the detecting device during a current welding operation with the one or more parameters stored in the data memory.

7. The method as claimed in claim 6, comprising visually outputting the differences between the one or more parameters detected by the detecting device during the current welding operation and the one or more parameters stored in the data memory or the information derived from the differences.

8. The method as claimed in claim 6, comprising wirelessly transmitting the differences between the one or more parameters detected by the detecting device during the current welding operation and the one or more parameters stored in the data memory or the information derived from the differences.

9. The method as claimed in claim 6, wherein the one or more parameters of the welding operation detected in f) comprise an electrical voltage and/or a current intensity of the welding current, and/or a speed and/or a position and/or a direction of movement of the welding stud and/or a number of welding operations carried out.

10. The method as claimed in claim 6, wherein one or more parameters of a subsequent welding operation are controlled in dependence on the one or more parameters detected during a previous welding operation.

11. The welding device as claimed in claim 2, the output device comprising a wireless transmission device.

* * * * *